(12) United States Patent
Schwersmann

(10) Patent No.: US 6,537,148 B2
(45) Date of Patent: Mar. 25, 2003

(54) GRAIN SEPARATING APPARATUS INCLUDING STEP-LIKE WEBS

(75) Inventor: Berthold Schwersmann, Bad Iburg (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/882,863

(22) Filed: Jun. 15, 2001

(65) Prior Publication Data

US 2002/0005034 A1 Jan. 17, 2002

(30) Foreign Application Priority Data

Jun. 15, 2000 (DE) .......................... 100 28 778

(51) Int. Cl.[7] .............................. A01F 12/24
(52) U.S. Cl. ...................... 460/107; 460/108
(58) Field of Search ............... 460/109, 108, 460/107, 72, 46, 62, 79, 80, 110, 141

(56) References Cited

U.S. PATENT DOCUMENTS

| 3,716,060 | A | * | 2/1973 | Suzue ........................ 460/108 |
| 3,927,678 | A | * | 12/1975 | Rowland-Hill .............. 460/109 |
| 3,957,058 | A | * | 5/1976 | Komancheck .............. 460/108 |
| 4,004,404 | A | * | 1/1977 | Rowland-Hil et al. ....... 56/14.6 |
| 4,031,901 | A | * | 6/1977 | Rowland-Hill .............. 460/108 |
| 4,875,891 | A | * | 10/1989 | Turner et al. ............... 460/110 |
| 4,909,772 | A | * | 3/1990 | Kuchar ........................ 460/71 |
| 5,024,631 | A | * | 6/1991 | Heidjann et al. ............. 460/75 |
| 5,489,239 | A | * | 2/1996 | Matousek et al. ............ 460/62 |
| 5,613,907 | A | * | 3/1997 | Harden ....................... 460/109 |
| 6,193,604 | B1 | * | 2/2001 | Ramp et al. ................ 460/110 |
| 6,358,142 | B1 | * | 3/2002 | Imel et al. .................. 460/109 |

FOREIGN PATENT DOCUMENTS

NL 7900185 7/1979

* cited by examiner

*Primary Examiner*—Thomas B. Will
*Assistant Examiner*—Árpád Fab Kovács
(74) *Attorney, Agent, or Firm*—Husch & Eppenberger, LLC; Robert E. Muir; David A. Chambers

(57) ABSTRACT

An apparatus for separating grain, kernel or cereal from harvested crop includes a separating rotor operatively mounted in a rotor housing and having a rotor axis, and a separating grate which partly surrounds the separating rotor and forms a lower part of the rotor housing. The separating grate includes a plurality of frame portions, profiles operatively connected to the plurality of frame portions and extending parallel to the rotor axis, and webs having apertures therein and bent in a step-like shape. The webs are mounted between the profiles and the plurality of frame portions and transverse to the rotor axis forming a sieve area for separating the grain from the crop mat. The separating grate is utilized in a combine harvester, preferably a self-propelled combine harvester. The sieve area is used to sift, separate or loosen grain, kernel or cereal from the crop with reduced fragmentation and clogging.

22 Claims, 4 Drawing Sheets

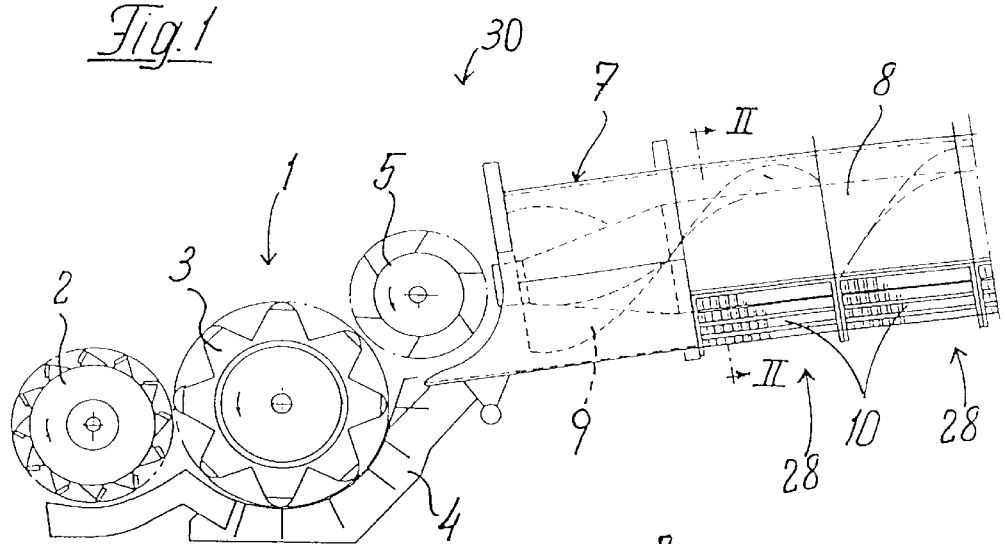
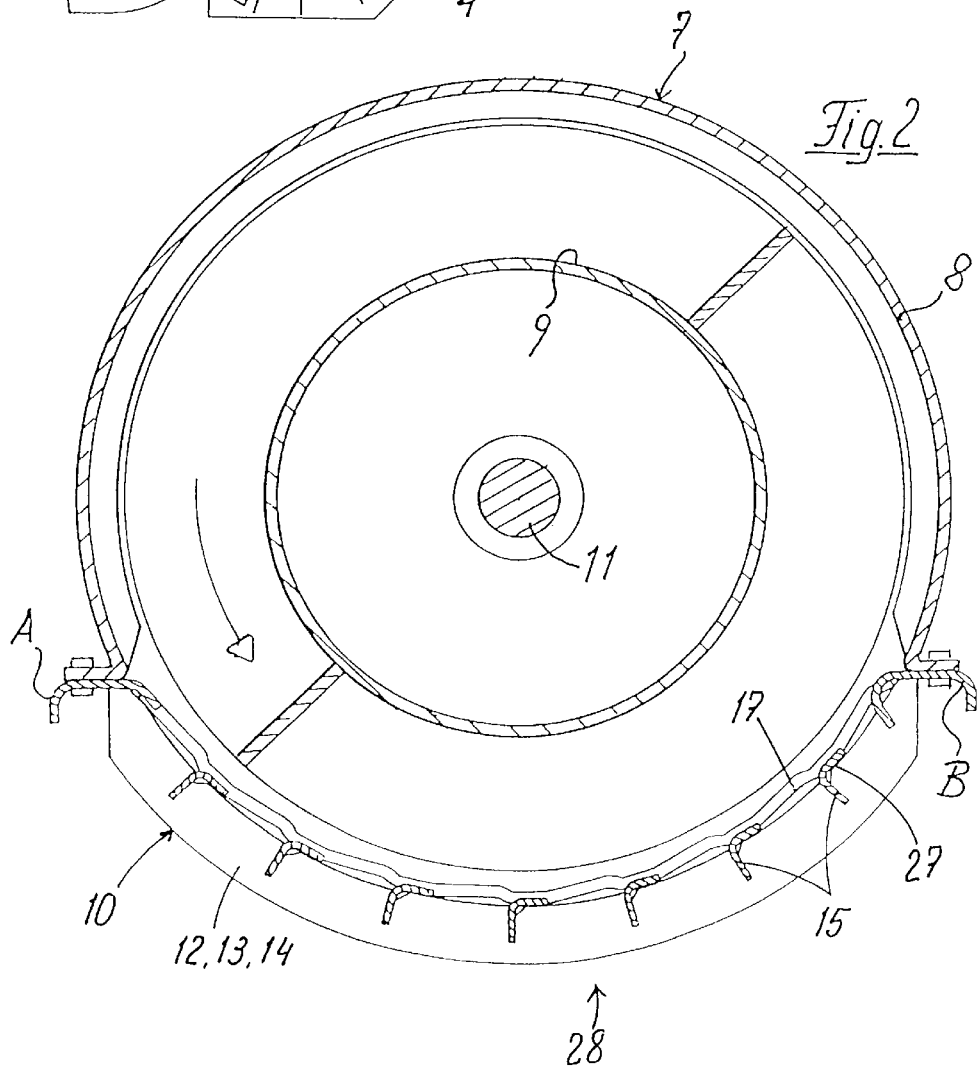

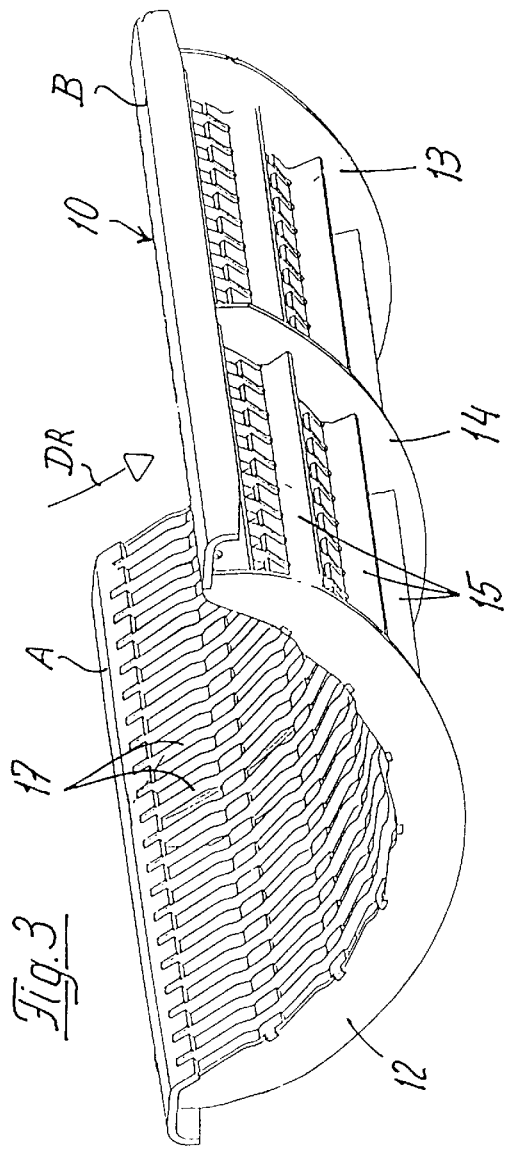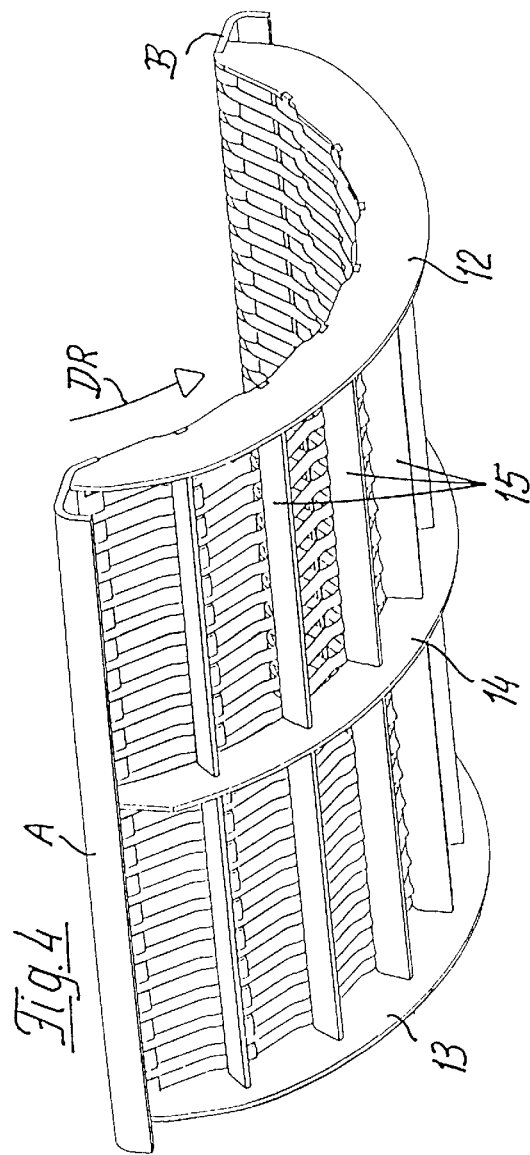

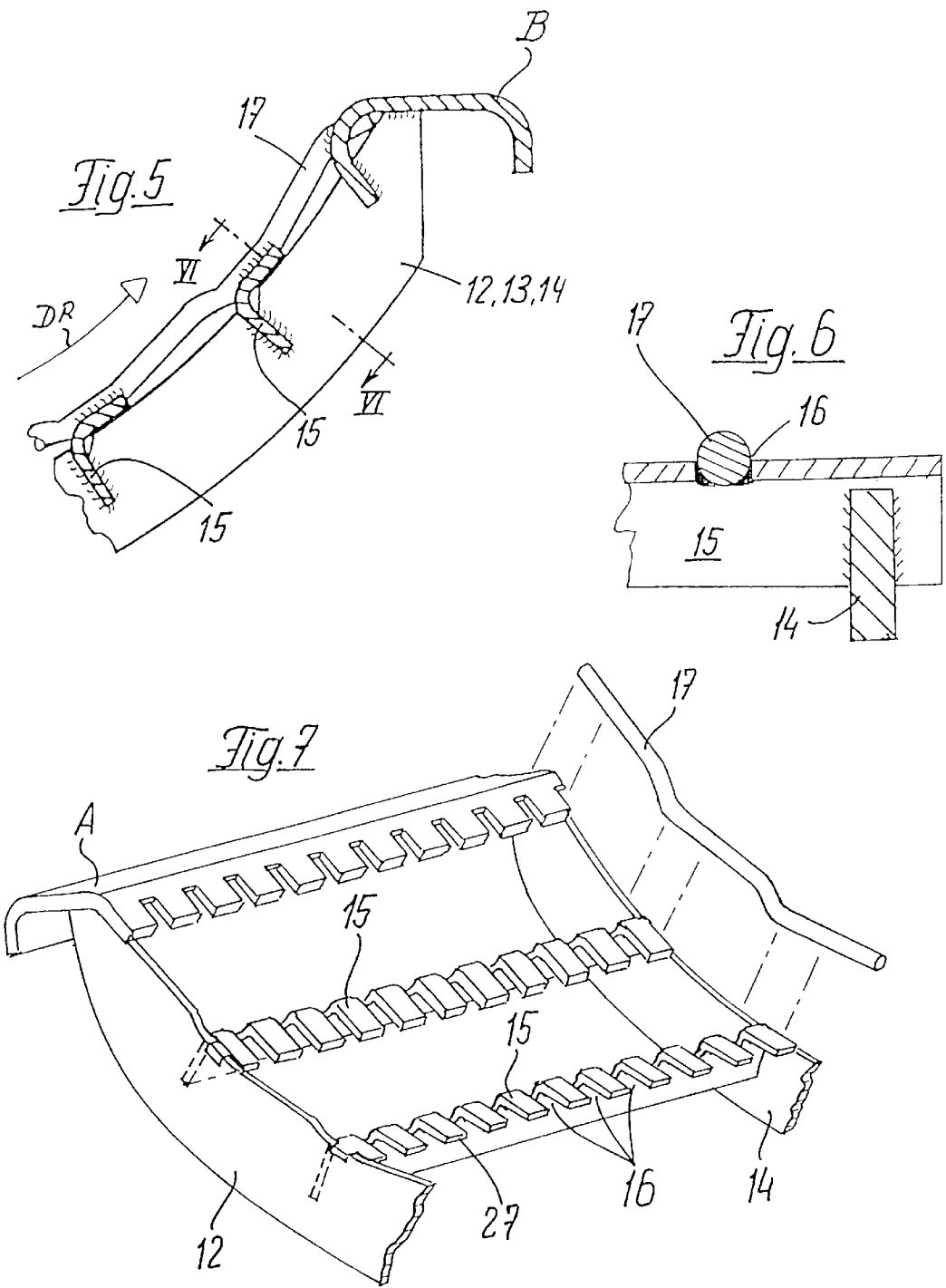

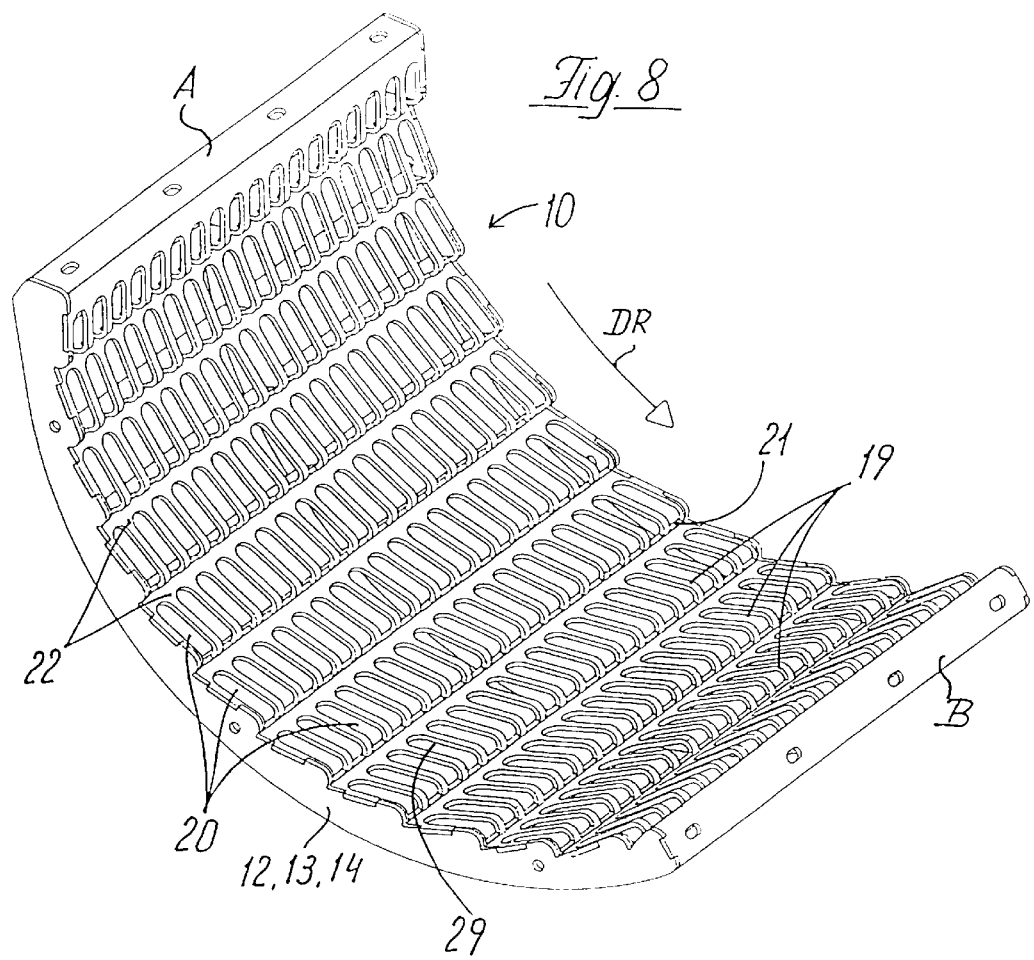
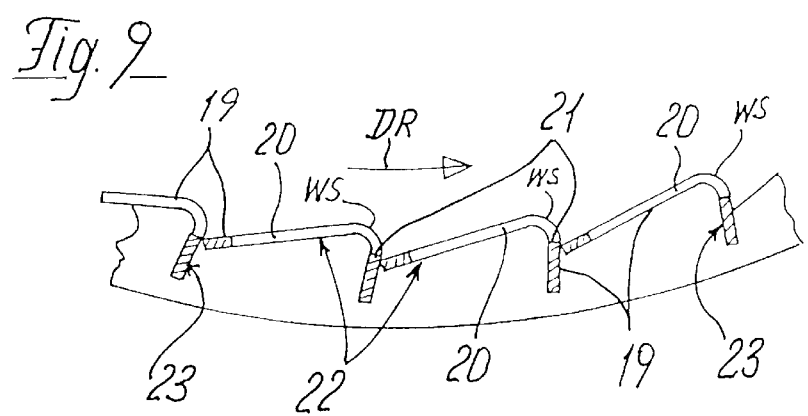

GRAIN SEPARATING APPARATUS INCLUDING STEP-LIKE WEBS

FIELD OF THE INVENTION

This invention relates to harvesting crop, and more specifically, to an apparatus for separating grain from crops.

DESCRIPTION OF THE RELATED ART

There are various types of apparatuses for separating grain from crop known to those skilled in the art. For example, in Netherlands Patent No. NL-A-7900185, there is an apparatus for separating grain from crop having a separating grate. The separating grate has a free end, wherein the free end has webs, which are bent in a direction towards the rotor axis. The separating grate has a guide surface in a step-like shape. This step-like shape causes a crop mat to loosen and the grain to separate. However, the disadvantages with this type of system is that when the crop is very dry, the grain or kernels may become fragmented causing clogging or blockages, damaged or cause overloading of the free ends having the webs. This results in, among other things, additional sieve cleaning and considerable grain or kernel loss. Moreover, the free ends having the webs must be made very stable to avoid uncontrolled vibrations resulting in relatively high costs.

The present invention is directed to overcoming one or more of the problems set forth above.

SUMMARY OF THE INVENTION

An aspect of the invention is to provide an apparatus for separating grain from crop that is reliable.

In another aspect of the invention there is provided an apparatus for separating grain from crop that is economical and inexpensive.

In another aspect of the invention there is provided an apparatus for separating grain from crop having webs bent in steps and constructed in one piece approximately parallel in a direction of rotation forming a sieve area, whereby the crop mat passing through is loosened without fragmenting the grain or kernels.

Yet another aspect of the invention there is provided an apparatus for separating grain from crop with a simple structural design, having a plurality of frame portions connected to profiles, and wherein the profiles have notches, which run in a circumferential direction of a separating grate and in which webs are constructed as rods are inserted and fixed therein, and wherein to prevent the profiles from adversely affecting through flow of the crop mat, the webs are partially inserted in the notches of the profiles.

The above aspects are merely illustrative and should not be construed as all-inclusive. The aspects should not be construed as limiting the scope of the invention rather the scope of the invention is detailed in the appended claims.

BRIEF DESCRIPTION OF THE DRAWINGS

Reference is now made to the drawings, which illustrate the best known mode of carrying out the invention and wherein the same reference characters indicate the same or similar parts throughout the views.

FIG. 1 is a side view of an apparatus for separating grain from crop having an axial separating device and feeding mechanism of a combine harvester, wherein the axial separating device has a sieve area;

FIG. 2 is an enlarged view of the axial separating device taken through cross-section line II—II from FIG. 1;

FIG. 3 is a perspective view of a separating grate from the sieve area;

FIG. 4 is a perspective view of the separating grate from a different angle as that illustrated in FIG. 3;

FIG. 5 is an enlarged partial view of the separating grate according to FIGS. 3 and 4;

FIG. 6 is a cross-sectional view through section line VI—VI from FIG. 5;

FIG. 7 is an enlarged partial view of the separating grate according to FIG. 3 partially assembled;

FIG. 8 is a perspective view of an alternative embodiment of the separating grate; and FIG. 9 is an enlarged partial view of the alternative embodiment of the separating grate according to FIG. 8.

DETAILED DESCRIPTION

The invention relates to a combine harvester (not shown) having an apparatus for separation grain from crop 30 or more specifically for separating grain from a crop mat. FIGS. 1 and 2 illustrate the apparatus for separating grain from crop 30, which has a feeding mechanism 1 and an axial separating device 7. The feeding mechanism 1 has a feed drum 2 for receiving the crop, a threshing cylinder 3 and associated concave 4 for, among other things, moving the crop, and a delivery drum 5 for feeding the crop into the axial separating device 7 for separation of the grain from the crop. The axial separating device 7 has a rotor housing 8 in which a separating rotor 9 is rotationally and operatively mounted therein and drivable by a rotor shaft 11 in a direction of rotation DR. A sieve area 28 is operatively mounted to the rotor housing 8. Separating grates 10 are part of the sieve area 28 and operatively mounted in close proximity to the separating rotor 9 in a lower region of the rotor housing 8, preferably below a rotor axis of the separating rotor 9. Referring now to FIGS. 1, 2, 3 and 4 in combination, the separating grates 10 have a plurality of frame portions 12, 13, 14. It is important to note that the plurality of frame portions 12, 13, 14 are shown with three frame portions for illustration purposes and is not meant to be limiting. The plurality of frame portions 12, 13, 14 are operatively connected to profiles 15, wherein the profiles 15 extend parallel to the rotor axis of the separating rotor 9. The profiles 15 have tip sections 27 that extend transverse to the rotor axis of the separating rotor 9. The plurality of frame portions 12, 13, 14 are attached to profile bars A, B, preferably by welding. The profiles 15 are rigidly, operatively connected to the plurality of frame portions 12, 13, 14. The profiles 15 are positioned so that at any given time one of the profile bars A, B are positioned in the direction of the throughput of the crop. Webs 17 are parallel to the tip section 27 of the profiles 15, operatively mounted between the profiles 15 and/or the plurality of frame portions 12, 13, 14. The webs 17 are transverse to the rotor axis of the separating rotor 9 at a distance from each other thereby forming the sieve area 28. The sieve area 28 is located between the separating rotor 9 and the rotor housing 8. The sieve area 28 is used to sift or separate the kernels from the crop. The webs 17 are located in the direction of the throughput of the crop. In the preferred embodiment, the webs 17 are constructed as rods and inserted and operatively mounted to the separating grates 10, and are constructed in one piece. The webs 17 as rods are made from a wire-like material. Referring now to FIG. 7, the profiles 15 have notches 16, and wherein the notches 16 prevent the profiles 15 from adversely affecting the through flow of the crop mat. In the preferred embodiment, the notches 16 run in the circumferential direction of the separating grate 10. The webs 17 are partially inserted in the notches 16 of the profiles 15. FIG. 6 illustrates a step-like shape the webs 17 are formed in. The webs 17 are repeatedly bent in steps, and inserted and attached to the notches 16. The webs 17 are preferably attached to the notches 16 by welding. In the preferred embodiment, the plurality of frame portions 12, 13, 14 are in a step-like shape as illustrated in FIG. 7. Referring now to FIGS. 5 and 6, the webs 17 are inserted in the notches 16 only so far as to protrude upwards beyond the profiles 15. By this design, the profiles 15 are precluded from extending into the crop stream and from adversely affecting the throughput of the crop stream.

FIGS. 8 and 9 illustrate an alternative embodiment of the sieve area 28 having separating grates 10. In this alternative embodiment, the separating grates 10 have the plurality of frame portions 12, 13, 14 and the profile bars A, B similar to the embodiment previously described. The plurality of frame portions 12, 13, 14 are in step-like shape and, as shown in FIG. 8, are each constructed in one piece. Perforated plates 19 are strip-like perforated plates and angularly curved, and operatively mounted between the profile bars A, B and the plurality of frame portions 12, 13, 14 such that there are no gaps or spaces between each of the perforated plates 19, the profile bars A, B and the plurality of frame portions 12, 13, 14. The perforated plates 19 are operatively mounted to the step-like shape portion of the plurality of frame portions 12, 13, 14 to form the sieve area 28. The sieve area 28 is used to sift or separate kernels from the crop. The plurality of frame portions 12, 13, 14 are operatively connected and transverse to the profile bars A, B. The perforated plates 19 have an angle WS. End sections of the perforated plates 19 are not in equal lengths. The arrangement of the perforated plates 19 form the perforation of the separating grates 10 or part of the sieve area 28. A first end 29 of the perforated plates 19 are arranged in such a way as to extend approximately transverse to the axis of the rotor shaft 11 of the separating rotor 9. The perforated plates 19 have apertures 20 that are oblong. By arrangement of the perforated plates 19, the apertures 20 are located in rows and columns closely adjacent to each other. Edges 21 are located in the aperture 20 and are straight and parallel to the rotor axis of the rotor shaft 11 of the separating rotor 9.

FIGS. 8 and 9 illustrate an at least one free-ending arm 22 located in a circumferential direction abutting without a gap, an at least one bent arm 23 of the perforated plates 19. The at least one bent arm 23 is adjacent to the at least one free-ending arm 22. The at least one bent arm 23 is bent radially, downwardly in such a way that the edges 21 of each of the perforated plates 19 lie at a same level as the free-ending arm 22 of the perforated plate 19 adjacent thereto, and form a straight line. The apertures 20 in the perforated plates 19 are through the at least one free-ending arm 22 and the at least one bent arm 23. Because of this, the apertures 20 and the at least one bent arm 23 bent radially, downwardly, the grain, kernel or cereal do not get caught in outlet ends of the apertures 20, which would inevitably lead to considerable problems in the crop stream, fragmentation of the grain, kernel or cereal, and blockage.

What is claimed is:

1. An apparatus for separating grain from a crop mat, comprising:

a separating rotor operatively mounted in a rotor housing and having a rotor axis; and a separating grate partly surrounding a lower part of the separating rotor and forming part of the rotor housing and including: a plurality of frame portions; a plurality of profiles operatively connected to the plurality of frame portions and extending parallel to the rotor axis; and a plurality of step-like shaped webs operatively mounted between the plurality of profiles and the plurality of frame portions and transverse to the rotor axis forming a sieve for separating the grain from the crop mat.

2. The apparatus for separating grain from a crop mat according to claim 1, wherein the plurality of step-like shaped webs are each constructed in one piece.

3. The apparatus for separating grain from a crop mat according to claim 1, wherein the plurality of profiles each include at least one notch and wherein the plurality of webs are operatively mounted to the notches of the plurality of profiles.

4. The apparatus for separating grain from a crop mat according to claim 1, wherein the plurality of profiles each include at least one notch and wherein the plurality of webs includes rods and are inserted and operatively mounted to the notches of the plurality of profiles.

5. The apparatus for separating grain from a crop mat according to claim 4, wherein the plurality of webs each include at least one rod that is inserted into the at least one notch for each of the plurality of profiles.

6. The apparatus for separating grain from a crop mat according to claim 3, wherein the plurality of webs are welded to the at least one notch for each of the plurality of profiles.

7. The apparatus for separating grain from a crop mat according to claim 4, wherein the plurality of webs each include at least one rod that is welded to the at least one notch for each of the plurality of profiles.

8. The apparatus for separating grain from a crop mat according to claim 4, wherein the plurality of webs includes rods of a wire-like material.

9. The apparatus for separating grain from a crop mat according to claim 7, wherein the plurality of webs as includes rods of a wire-like material.

10. The apparatus for separating grain from a crop mat according to claim 4, wherein the plurality of profiles are parallel to the rotor axis.

11. The apparatus for separating grain from a crop mat according to claim 5, wherein the plurality of profiles are parallel to the rotor axis.

12. The apparatus for separating grain from a crop mat according to claim 9, wherein the plurality of profiles are parallel to the rotor axis.

13. The apparatus for separating grain from a crop mat according to claim 1, wherein the plurality of frame portions have a step-like shape similar to the step-like shape of the plurality of webs.

14. The apparatus for separating grain from a crop mat according to claim 3, wherein the plurality of frame portions have a step-like shape similar to the step-like shape of the plurality of webs.

15. The apparatus for separating grain from a crop mat according to claim 4, wherein the plurality of frame portions have a step-like shape similar to the step-like shape of the plurality of webs.

16. In an apparatus for separating grain from a crop mat including a separating rotor operatively mounted in a rotor housing and having a rotor axis; the improvement comprising:

a separating grate partly surrounding the separating rotor and forming part of the rotor housing and including: a plurality of step-like shaped frame portions; and a plurality of perforated plates having at least one aperture therein and operatively mounted to the plurality of step-like shaped frame portions for forming a sieve area for separating the grain from the crop mat.

17. The apparatus for separating grain from a crop mat according to claim 16, wherein the plurality of step-like shaped frame portions are each constructed in one piece.

18. The apparatus for separating grain from a crop mat according to claim 16, wherein the plurality of perforated plates are operatively mounted between the plurality of frame portions and a plurality of profile bars.

19. The apparatus for separating grain from a crop mat according to claim 18, wherein the plurality of perforated plates have at least one free-ending arm and at least one bent arm, wherein the at least one aperture of the plurality of perforated plates are through the at least one free-ending arm and the at least one bent arm.

20. The apparatus for separating grain from a crop mat according to claim 19, wherein at least one edge of the plurality of perforated plates are substantially level with the at least one free-ending arm and the at least one bent arm, thereby forming a straight line.

21. An apparatus for separating grain from a crop mat, comprising:

a separating rotor operatively mounted in a rotor housing and having a rotor axis;

a separating grate located between the separating rotor and the rotor housing and including a plurality of frame portions; and a plurality of perforated plates having at least one aperture therein and operatively mounted to the step-like shape of the plurality of frame portions forming a sieve area for separating the grain from the crop mat;

wherein each of the plurality of perforated plates have at least one free-ending arm and at least one bent arm and wherein the at least one aperture of the plurality of perforated plates are through the at least one free-ending arm and the at least one bent arm.

22. The apparatus for separating grain from a crop mat according to claim 21, wherein the at least one aperture has an edge that is substantially parallel to the rotor axis.

* * * * *